(12) United States Patent
Kim et al.

(10) Patent No.: US 11,330,523 B2
(45) Date of Patent: May 10, 2022

(54) METHOD FOR PERFORMING COMMUNICATION ON BASIS OF POWER-SAVING OPERATION IN WIRELESS LAN SYSTEM, AND WIRELESS TERMINAL USING SAME

(71) Applicant: LG ELECTRONICS INC., Seoul (KR)

(72) Inventors: Suhwook Kim, Seoul (KR); Jeongki Kim, Seoul (KR); Kiseon Ryu, Seoul (KR); Taewon Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 13 days.

(21) Appl. No.: 16/961,655

(22) PCT Filed: Jan. 11, 2019

(86) PCT No.: PCT/KR2019/000445
§ 371 (c)(1),
(2) Date: Jul. 10, 2020

(87) PCT Pub. No.: WO2019/139398
PCT Pub. Date: Jul. 18, 2019

(65) Prior Publication Data
US 2020/0404588 A1     Dec. 24, 2020

Related U.S. Application Data

(60) Provisional application No. 62/616,434, filed on Jan. 12, 2018, provisional application No. 62/618,006, filed on Jan. 16, 2018.

(51) Int. Cl.
*H04W 52/02*     (2009.01)
*H04W 84/12*     (2009.01)

(52) U.S. Cl.
CPC ........ *H04W 52/0235* (2013.01); *H04W 84/12* (2013.01)

(58) Field of Classification Search
CPC . H04W 52/0235; H04W 84/12; H04W 52/02; Y02D 30/70
See application file for complete search history.

(56) References Cited

U.S. PATENT DOCUMENTS

2014/0185501 A1\* 7/2014 Park ..................... H04W 76/28
370/311
2016/0198417 A1 7/2016 Park et al.
(Continued)

OTHER PUBLICATIONS

PCT International Application No. PCT/KR2019/000445, International Search Report dated Apr. 9, 2019, 2 pages.
(Continued)

*Primary Examiner* — Mohammad S Anwar
(74) *Attorney, Agent, or Firm* — Lee Hong Degerman Kang & Waimey

(57) ABSTRACT

A method for performing communication based on a power saving operation in a wireless LAN system according to an embodiment includes: receiving, by a first wireless terminal including a main radio module and a wake-up radio (WUR) module for receiving a wake-up packet modulated with on-off keying (OOK), the wake-up packet from a second wireless terminal based on the WUR module in a WUR mode in which the WUR module is controlled to alternate between a turn-on state and a turn-off state based on a power state of the main radio module, the wake-up packet including information related to an individually addressed frame for the first wireless terminal; and controlling, by the first wireless terminal, the main radio module such that the main radio module is in an awake state in a predetermined service period related to the main radio module when a predeter-
(Continued)

mined time has elapsed after reception of the wake-up packet.

6 Claims, 16 Drawing Sheets

(56) References Cited

U.S. PATENT DOCUMENTS

2016/0374019 A1* 12/2016 Park ................ H04L 5/0053
2017/0332327 A1* 11/2017 Fang ................ H04W 16/14

OTHER PUBLICATIONS

Intel Corporation et al., "Target Wake Time for MU Measurement Scheduling" IEEE, 802.11-17/1128r0, Jul. 11, 2017, 13 pages.
Intel Corporation et al., Proposal for LP-WUR (Low-Power Wake-Up Receiver) Study Group, IEEE 802.11-16/0605r3, May 17, 2016, 16 pages.
Wilus, "WUR Guard Time follow-up," IEEE 802.11-17/1684r2, Nov. 9, 2017, 12 pages.

* cited by examiner

FIG. 1
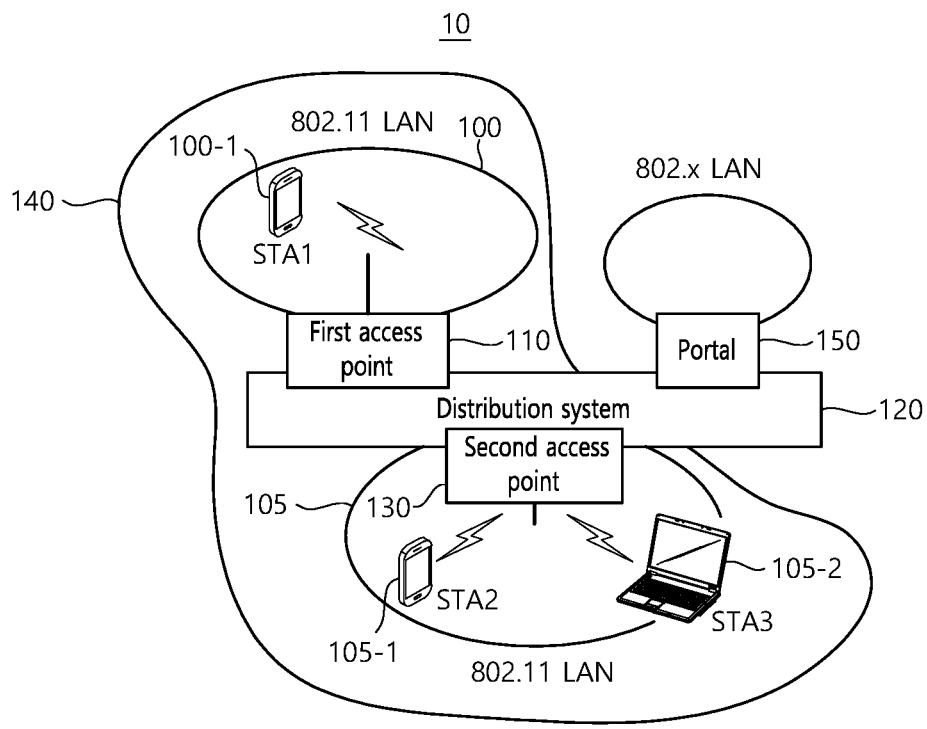
(A)
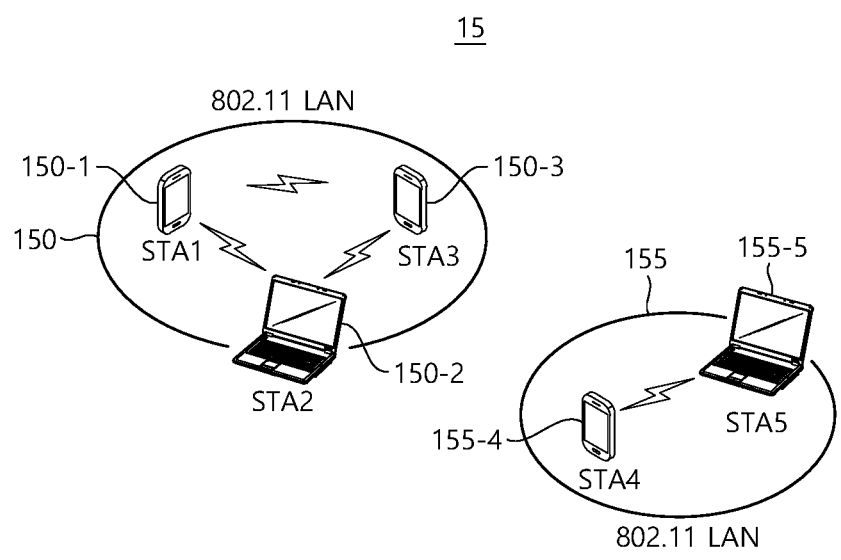
(B)

METHOD FOR PERFORMING COMMUNICATION ON BASIS OF POWER-SAVING OPERATION IN WIRELESS LAN SYSTEM, AND WIRELESS TERMINAL USING SAME

CROSS-REFERENCE TO RELATED APPLICATIONS

This application is the National Stage filing under 35 U.S.C. 371 of International Application No. PCT/KR2019/000445, filed on Jan. 11, 2019, which claims the benefit of U.S. Provisional Application No. 62/616,434, filed on Jan. 12, 2018, and 62/618,006, filed on Jan. 16, 2018, the contents of which are all hereby incorporated by reference herein in their entirety.

TECHNICAL FIELD

The present disclosure relates to wireless communication, and more specifically, to a method for performing communication based on a power saving operation in a wireless LAN system and a wireless terminal using the same.

BACKGROUND ART

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

DISCLOSURE

Technical Problem

An object of the present specification is to provide a method for performing communication based on a power saving operation in a wireless LAN system with improved performance and a wireless terminal using the same.

Technical Solution

A method for performing communication based on a power saving operation in a wireless LAN system according to an embodiment includes: receiving, by a first wireless terminal including a main radio module and a WUR module for receiving a wake-up packet modulated with OOK, the wake-up packet from a second wireless terminal based on the WUR module in a WUR mode in which the WUR module is controlled to alternate between a turn-on state and a turn-off state based on a power state of the main radio module, the wake-up packet including information related to an individually addressed frame for the first wireless terminal; and controlling, by the first wireless terminal, the main radio module such that the main radio module is in an awake state in a predetermined service period related to the main radio module when a predetermined time has elapsed after reception of the wake-up packet.

Advantageous Effects

According to an embodiment of the present specification, a method for performing communication based on a power saving operation in a wireless LAN system with improved performance and a wireless terminal using the same are provided.

DESCRIPTION OF DRAWINGS

FIG. 1 is a conceptual diagram illustrating a structure of a WLAN.

MODE FOR DISCLOSURE

Figure 2:
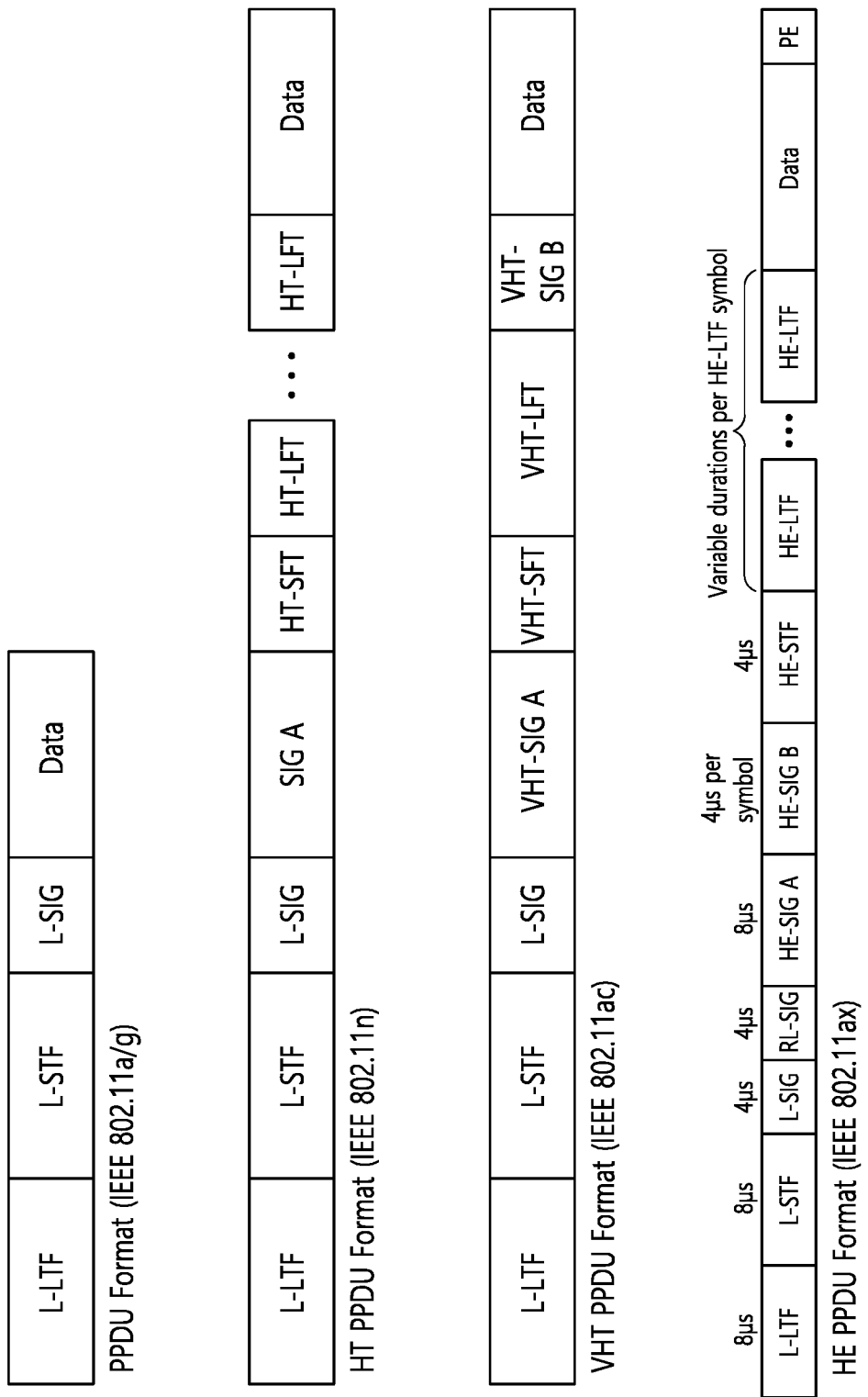
FIG. 2 is a diagram illustrating an example of a PPDU used in an IEEE standard.

The above-described features and the following detailed description are exemplary contents for helping a description and understanding of the present specification. That is, the present specification is not limited to this embodiment and may be embodied in other forms. The following embodiments are merely examples to fully disclose the present specification, and are descriptions to transfer the present specification to those skilled in the art. Therefore, when there are several methods for implementing components of the present specification, it is necessary to clarify that the present specification may be implemented with a specific one of these methods or equivalent thereof.

In the present specification, when there is a description in which a configuration includes specific elements, or when there is a description in which a process includes specific steps, it means that other elements or other steps may be further included. That is, the terms used in the present specification are only for describing specific embodiments and are not intended to limit the concept of the present specification. Furthermore, the examples described to aid the understanding of the present specification also include complementary embodiments thereof.

The terms used in the present specification have the meaning commonly understood by one of ordinary skill in the art to which the present specification belongs. Terms commonly used should be interpreted in a consistent sense in the context of the present specification. Further, terms used in the present specification should not be interpreted in an idealistic or formal sense unless the meaning is clearly defined. Hereinafter, embodiments of the present specification will be described with reference to the accompanying drawings.

FIG. 1 is a conceptual diagram illustrating a structure of a WLAN system.

FIG. 1(A) illustrates a structure of an infrastructure network of institute of electrical and electronic engineers (IEEE) 802.11.

Referring to FIG. 1(A), a WLAN system 10 of FIG. 1(A) may include at least one basic service set (hereinafter, referred to as 'BSS') 100 and 105. The BSS is a set of access points (hereinafter, APs) and stations (hereinafter, STAs) that can successfully synchronize and communicate with each other and is not a concept indicating a specific area.

For example, a first BSS 100 may include a first AP 110 and one first STA 100-1. A second BSS 105 may include a second AP 130 and one or more STAs 105-1 and 105-2.

The infrastructure BSSs 100 and 105 may include at least one STA, APs 110 and 130 for providing a distribution service, and a distribution system (DS) 120 for connecting a plurality of APs.

The DS 120 may connect a plurality of BSSs 100 and 105 to implement an extended service set (hereinafter, 'ESS') 140. The ESS 140 may be used as a term indicating one network to which at least one AP 110 and 130 is connected through the DS 120. At least one AP included in one ESS 140 may have the same service set identification (hereinafter, SSID).

A portal 150 may serve as a bridge for connecting a WLAN network (IEEE 802.11) with another network (e.g., 802.X).

In a WLAN having a structure as illustrated in FIG. 1(A), a network between the APs 110 and 130 and a network between APs 110 and 130 and STAs 100-1, 105-1, and 105-2 may be implemented.

FIG. 1(B) is a conceptual diagram illustrating an independent BSS. Referring to FIG. 1(B), a WLAN system 15 of FIG. 1(B) may perform communication by setting a network between STAs without the APs 110 and 130, unlike FIG. 1(A). A network that performs communication by setting a network even between STAs without the APs 110 and 130 is defined to an ad-hoc network or an independent basic service set (hereinafter, 'BSS').

Referring to FIG. 1(B), an IBSS 15 is a BSS operating in an ad-hoc mode. Because the IBSS does not include an AP, there is no centralized management entity. Therefore, in the IBSS 15, STAs 150-1, 150-2, 150-3, 155-4, and 155-5 are managed in a distributed manner.

All STAs 150-1, 150-2, 150-3, 155-4, and 155-5 of the IBSS may be configured with mobile STAs, and access to a distributed system is not allowed. All STAs of the IBSS form a self-contained network.

The STA described in the present specification is a random function medium including a medium access control (hereinafter, MAC) following a standard of the Institute of Electrical and Electronics Engineers (IEEE) 802.11 standard and a physical layer interface for a wireless medium and may broadly be used as a meaning including both an AP and a non-AP station (STA).

The STA described in the present specification may also be referred to as various names such as a mobile terminal, a wireless device, a wireless transmit/receive unit (WTRU), a user equipment (UE), a mobile station (MS), a mobile subscriber unit, or simply a user.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

The present embodiment proposes an improved scheme for a signal (or control information field) used for a data field of a PPDU. The signal mentioned in the present embodiment may be applied onto high efficiency PPDU (HE PPDU) according to an IEEE 802.11ax standard. The signal mentioned in the present specification may be HE-SIG-A and/or HE-SIG-B included in the HE PPDU. For example, the HE-SIG-A and the HE-SIG-B may also be respectively represented as SIG-A and SIG-B. However, the signal mentioned in the present specification is not necessarily limited to an HE-SIG-A and/or HE-SIG-B standard and may be applied to control/data fields having various names, which include control information in a wireless communication system transferring user data.

In addition, the HE PPDU of FIG. 2 is an example of a PPDU for multiple users. The HE-SIG-B may be included only when the PPDU is for multiple users. The HE SIG-B may be omitted in a PPDU for a single user.

As illustrated, the HE-PPDU for multiple users (MUs) may include various fields such as legacy-short training field (L-STF), legacy-long training field (L-LTF), legacy-signal (L-SIG), high efficiency-signal A (HE-SIG A), high efficiency-signal-B (HE-SIG B), high efficiency-short training field (HE-STF), high efficiency-long training field (HE-LTF), data field (alternatively, a MAC payload), and packet extension (PE). Each of the fields may be transmitted during an illustrated time period (that is, 4 or 8 μs).

The PPDU used in the IEEE standard is mainly described as a PPDU structure transmitted with a channel bandwidth of 20 MHz. The PPDU structure transmitted with a bandwidth (e.g., 40 MHz and 80 MHz) wider than the channel bandwidth of 20 MHz may be a structure in which linear scaling is applied to the PPDU structure used in the channel bandwidth of 20 MHz.

The PPDU structure used in the IEEE standard may be generated based on 64 Fast Fourier Transforms (FTFs), and a cyclic prefix portion (CP portion) may be ¼. In this case, a length of an effective symbol interval (or FFT interval) may be 3.2 us, a CP length may be 0.8 us, and symbol duration may be 4 us (3.2 us+0.8 us) that adds the effective symbol interval and the CP length.

Figure 3:
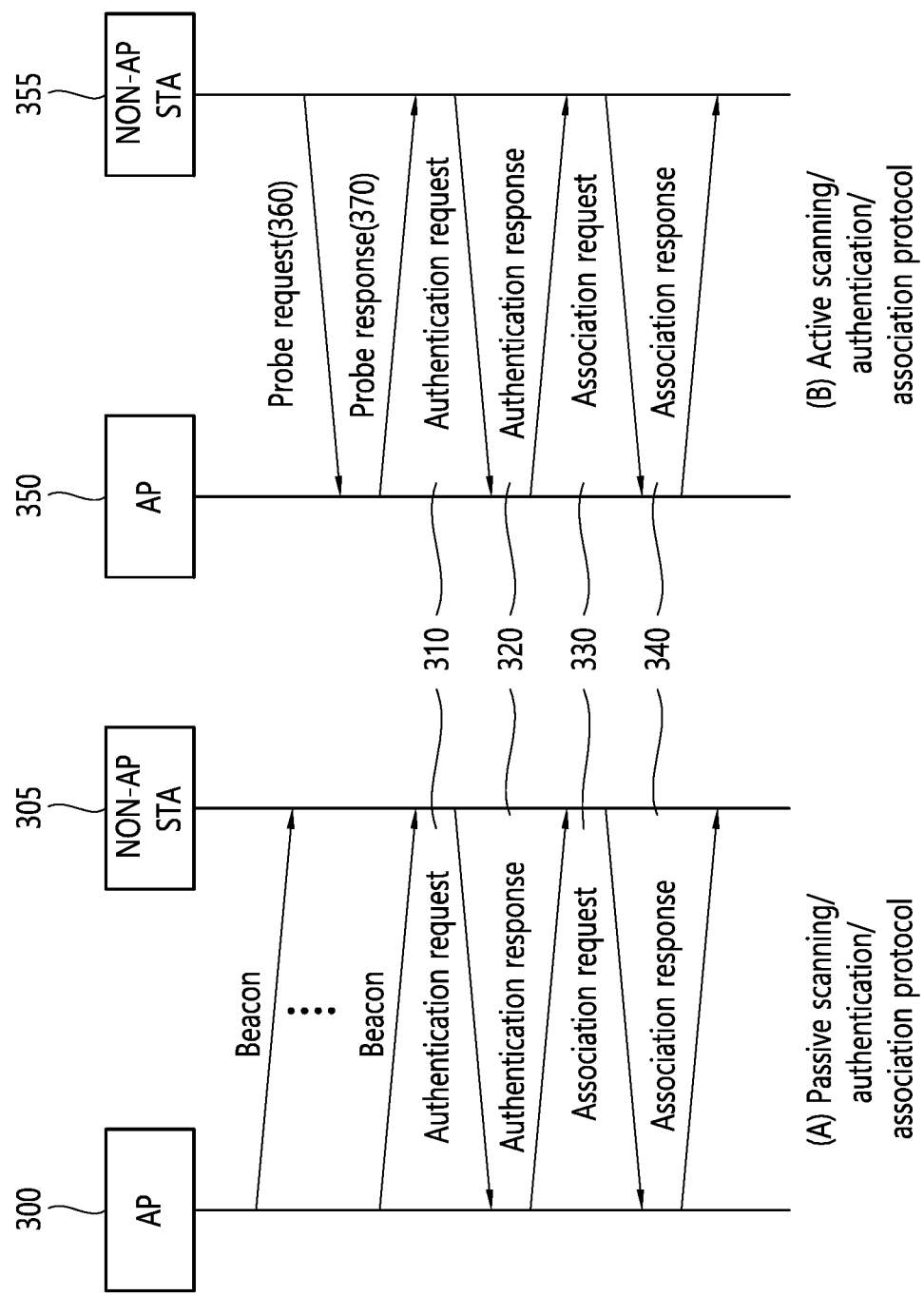
FIG. 3 is a conceptual diagram illustrating an authentication and association procedure after scanning of an AP and an STA.

FIG. 3 is a conceptual view illustrating an authentication and association procedure after scanning of an AP and an STA.

Referring to FIG. 3, a non-AP STA may perform the authentication and association procedure with respect to one AP among a plurality of APs which have completed a scanning procedure through passive/active scanning. For example, the authentication and association procedure may be performed through 2-way handshaking.

FIG. 3(A) is a conceptual view illustrating an authentication and association procedure after passive scanning, and FIG. 3(B) is a conceptual view illustrating an authentication and association procedure after active scanning.

The authentication and association procedure may be performed regardless of whether the active scanning or the passive scanning is used. For example, APs 300 and 350 exchange an authentication request frame 310, an authentication response frame 320, an association request frame 330, and an association response frame 340 with the non-AP STAs 305 and 355 to perform the authentication and association procedure.

More specifically, the authentication procedure may be performed by transmitting the authentication request frame 310 from the non-AP STAs 305 and 355 to the APs 300 and 350. The APs 300 and 350 may transmit the authentication response frame 320 to the non-AP STAs 305 and 355 in response to the authentication request frame 310. An authentication frame format is disclosed in IEEE 802.11 8.3.3.11.

More specifically, the association procedure may be performed when the non-AP STAs 305 and 355 transmit the association request frame 330 to the APs 300 and 305. The APs 300 and 350 may transmit the association response frame 340 to the non-AP STAs 305 and 355 in response to the association request frame 330.

The association request frame 330 may include information on capability of the non-AP STAs 305 and 355. The APs 300 and 350 may determine whether the non-AP STAs 305 and 355 can be supported based on the information on capability of the non-AP STAs 305 and 355 and included in the association request frame 330.

For example, if the support is available, the AP 300 and 350 may transmit to the non-AP STAs 305 and 355 by allowing the association response frame 340 to contain whether the association request frame 330 is acceptable, its reason, and its supportable capability information. An association frame format is disclosed in IEEE 802.11 8.3.3.5/8.3.3.6.

When up to the association procedure mentioned in FIG. 3 is performed, normal data transmission and reception procedures may be performed between the AP and the STA.

Figure 4:
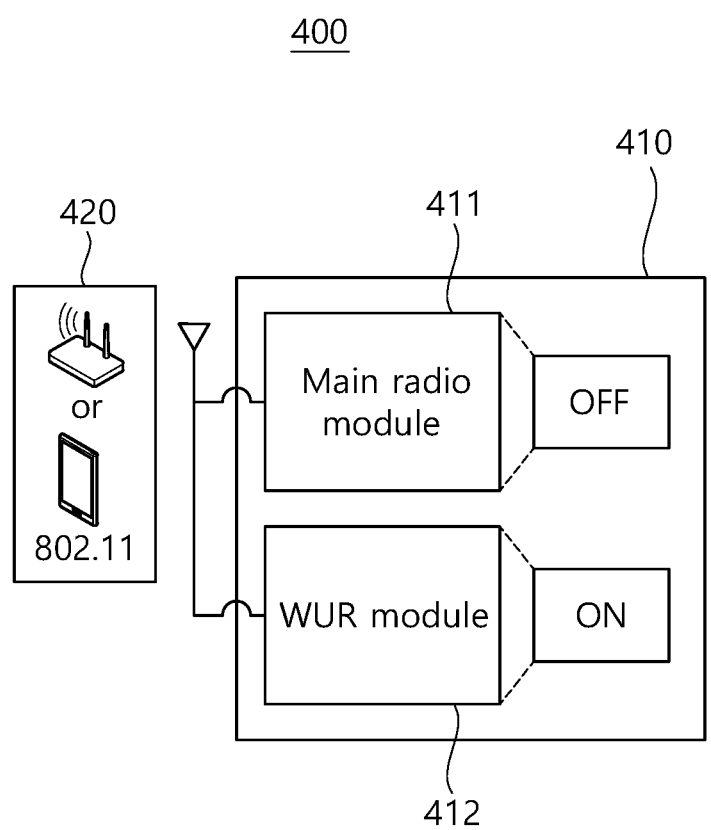
FIG. 4 is an internal block diagram of a wireless terminal receiving a wake-up packet.

FIG. 4 is an internal block diagram of a wireless terminal receiving a wake-up packet.

Referring to FIG. 4, a WLAN system 400 according to the present embodiment may include a first wireless terminal 410 and a second wireless terminal 420.

The first wireless terminal 410 may include a main radio module 411 related to main radio (e.g., 802.11 radio) and a WUR module 412 including low-power wake-up radio (LP WUR). In the present specification, the main radio module may be referred to as a primary component radio (hereinafter, PCR) module.

For example, the main radio module 411 may include a plurality of circuits supporting Wi-Fi, Bluetooth® radio (hereinafter, BT radio), and Bluetooth® Low Energy radio (hereinafter, BLE radio).

In the present specification, the first wireless terminal 410 may control the main radio module 411 in an awake state or a doze state.

For example, when the main radio module 411 is in the awake state, the first wireless terminal 410 is able to transmit an 802.11-based frame (e.g., 802.11-type PPDU) or receive an 802.11-based frame based on the main radio module 411. For example, the 802.11-based frame may be a non-HT PPDU of a 20 MHz band.

For another example, when the main radio module 411 is in the doze state, the first wireless terminal 410 is not able to transmit the 802.11-based frame (e.g., 802.11-type PPDU) or receive the 802.11-based frame based on the main radio module 411.

That is, when the main radio module 411 is in the doze state (e.g., OFF state), the first wireless terminal 400 is not able to receive a frame (e.g., 802.11-type PPDU) transmitted by the second wireless terminal 420 (e.g., AP) until the WUR module 412 wakes up the main radio module 411 to transition to the awake state according to a wake-up packet (hereinafter, WUP).

In the present specification, the first wireless terminal 410 may control the WUR module 412 in the turn-off state or the turn-on state.

For example, the first wireless terminal 410 including the WUR module 412 in the turn-on state is able to receive (or demodulate) only a specific-type frame (i.e., WUR PPDU) transmitted by the second wireless terminal 420 (e.g., AP).

In this case, the specific-type frame (e.g., WUR PPDU) may be a frame (e.g., wake-up packet) modulated by an on-off keying (OOK) modulation scheme described below with reference to FIG. 5.

For example, the first wireless terminal 410 including the WUR module 412 in the turn-off state is not able to receive (or demodulate) a specific-type frame (e.g., WUR PPDU) transmitted by the second wireless terminal 420 (e.g., AP).

In the present specification, the first wireless terminal 410 can operate a main radio module (i.e., PCR module 411) and a WUR module 412.

For example, when the main radio module 411 is in a power save mode (hereinafter referred to as a PS mode)), the first wireless terminal 410 can control the main radio module 411 such that it alternates between a doze state and an awake state according to communication environment.

For example, when the WUR module 412 is in a WUR mode, the first wireless terminal 410 can control the WUR module 412 such that it alternates between a turn-on state and a turn-off state according to a state of the main radio module 411 and a duty cycle schedule agreed in advance for the WUR module.

Here, a wake-up packet modulated with OOK can be received based on the WUR module 412 in a turn-on state. In other words, the wake-up packet cannot be received based on the WUR module 412 in a turn-off state.

Specifically, when the main radio module 411 is in a doze state, the first wireless terminal 410 in a WUR mode controls the WUR module 412 such that it is in a turn-on state for a duty cycle schedule agreed between the first wireless terminal 410 and the second wireless terminal 420.

Further, when the main radio module 411 is in an awake-state, the first wireless terminal in the WUR mode may control the WUR module 412 such that it is in a turn-off state.

That is, a wireless terminal in the WUR mode may be understood as a wireless terminal having a negotiation status between an AP and a WUR STA, in which the WUR module alternates between a turn-of state and a turn-off state when the main radio module is in a doze state.

For example, the first wireless terminal 410 in the WUR mode can receive a wake-up packet (WUP) based on the WUR module 412 in a turn-on state. Further, when the WUR module 412 receives a WUP, the first wireless terminal 410 in the WUR mode can control the WUR module 412 such that it wakes the main radio module 411 up.

In the present specification, the terms "awake state" and "turn-on state" may be interchanged in order to indicate an ON state of a specific module included in a wireless terminal. In the same context, the terms "doze state" and "turn-off state" may be interchanged in order to indicate an OFF state of a specific module included in a wireless terminal.

The first wireless terminal 410 according to the present embodiment can receive a legacy frame (e.g., a PPDU based on 802.11) from another wireless terminal 420 (e.g., AP) based on the main radio module 411 or the WUR module 412 in an awake state.

The WUR module 412 may be a receiver for switching the main radio module 411 in a doze state to an awake state. That is, the WUR module 412 may not include a transmitter.

The first wireless terminal 410 can operates the WUR module 412 in a turn-on state for a duration in which the main radio module 411 is in a doze state.

For example, when a WUP is received based on the WUR module 412 in a turn-on state, the first wireless terminal 410 can control the main radio module 411 in a doze state such that it switches to an awake state.

For reference, a low power wake-up receiver (LP WUR) included in the WUR module 412 aims at target power consumption of less than 1 mW. Further, the LP WUR may use a narrow bandwidth of less than 5 MHz.

In addition, power consumption of the LP WUR may be less than 1 Mw. Further, a target transmission range of the LP WUR may be the same as that of the legacy 802.11.

The second wireless terminal 420 according to the present embodiment can transmit user data based on main radio (i.e., 802.11). The second wireless terminal 420 can transmit a WUP for the WUR module 412.

In the present specification, when a wireless terminal includes the main radio module and the WUR module, the wireless terminal may be referred to as a WUR STA.

Figure 5:
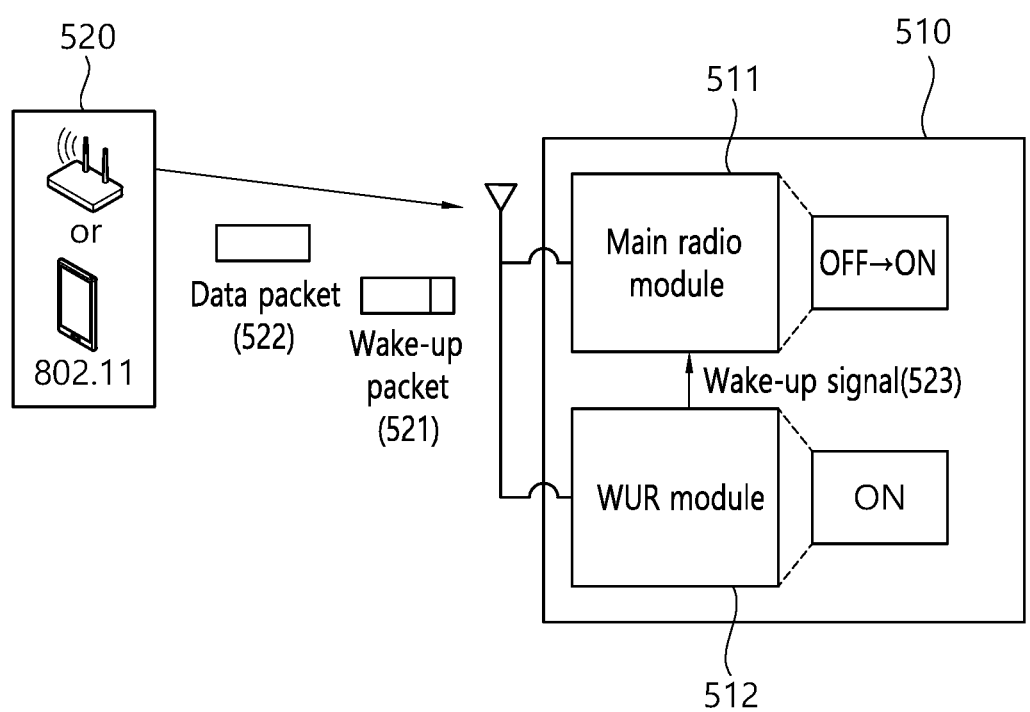
FIG. 5 is a conceptual diagram illustrating a method in which a wireless terminal receives a wake-up packet and a data packet.

FIG. 5 is a conceptual diagram illustrating a method in which a wireless terminal receives a wake-up packet and a data packet.

Referring to FIG. 4 and FIG. 5, a WLAN system 500 according to the present embodiment may include a first wireless terminal 510 corresponding to a receiving terminal and a second wireless terminal 520 corresponding to a transmitting terminal.

A basic operation of the first wireless terminal 510 of FIG. 5 may be understood through a description of the first wireless terminal 410 of FIG. 4. Similarly, a basic operation of the second wireless terminal 520 of FIG. 5 may be understood through a description of the second wireless terminal 420 of FIG. 4.

Referring to FIG. 5, the wake-up packet 521 may be received in a WUR module 512 in a turn-on state (e.g., ON state).

In this case, the WUR module 512 may transfer a wake-up signal 523 to a main radio module 511 in a doze state (e.g., OFF state) in order to accurately receive a data packet 522 to be received after the wake-up packet 521.

For example, the wake-up signal 523 may be implemented based on an internal primitive of the first wireless terminal 510.

For example, when the wake-up signal 523 is received in the main radio module 511 in the doze state (e.g., OFF state), the first wireless terminal 510 may control the main radio module 511 to transition to the awake state (i.e., ON state).

For example, when the main radio module 511 transitions from the doze state (e.g., OFF state) to the awake state (i.e., ON state), the first wireless terminal 510 may activate all or some of a plurality of circuits (not shown) supporting Wi-Fi, BT radio, and BLE radio included in the main radio module 511.

For another example, actual data included the wake-up packet 521 may be directly transferred to a memory block (not shown) of a receiving terminal even if the main radio module 511 is in the doze state (e.g., OFF state).

For another example, when an IEEE 802.11 MAC frame is included in the wake-up packet 521, the receiving terminal may activate only a MAC processor of the main radio module 511. That is, the receiving terminal may maintain a PHY module of the main radio module 511 to be in an inactive state. The wake-up packet 521 of FIG. 5 will be described below in greater detail with reference to the accompanying drawings.

The second wireless terminal 520 may be configured to transmit the wake-up packet 521 to the first wireless terminal 510.

Referring to FIG. 5, to indicates that an individually addressed frame(s) for the first wireless terminal 510 is available through the main radio module 511 (i.e., to indicate the presence of an individually addressed frame(s) buffered by the second wireless terminal for the first wireless terminal), the second wireless terminal 520 can transmit a wake-up packet 521 to the first wireless terminal 510 associated with the second wireless terminal 520.

For example, the wake-up packet 521 may include information (e.g., a WUR ID) for identifying the first wireless terminal 510.

Alternatively, the wake-up packet 521 may include information (e.g., a group ID) for identifying a group of a plurality of wireless terminals including the first wireless terminal 510.

Alternatively, the wake-up packet 521 may include a plurality of pieces of identification information in a frame body field. Here, the plurality of pieces of identification information may include one for identifying the first wireless terminal 510.

Figure 6:
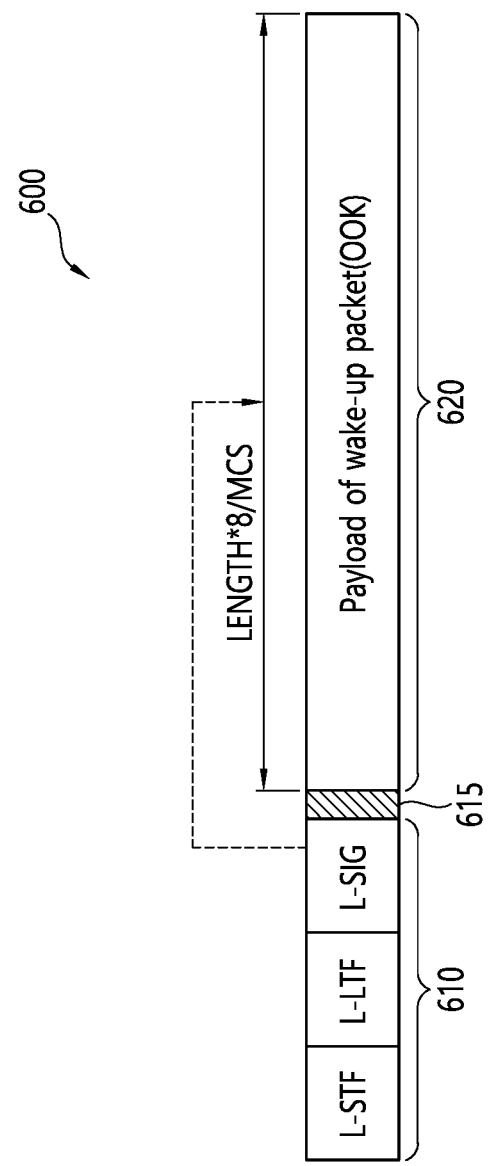
FIG. 6 shows an example of a wake-up packet format.

FIG. 6 illustrates an example of a WUR PPDU format.

Referring to FIGS. 1 to 6, a wakeup packet 600 may include at least one legacy preamble 610. In addition, the wake-up packet 600 may include a payload 620 after the legacy preamble 610. The payload 620 may be modulated by a simple modulation scheme (e.g., On-Off Keying (OOK) modulation scheme). The wakeup packet 600 including a payload may be transmitted based on a relatively small bandwidth.

Referring to FIGS. 1 to 6, the second wireless terminal (e.g., 520) may be configured to generate and/or transmit wakeup packets 521 and 600. The first wireless terminal (e.g., 510) may be configured to process the received wakeup packet 521.

For example, the wake-up packet 600 may include any other preamble (not shown) or a legacy preamble 610 defined in the existing IEEE 802.11 standard. The wakeup packet 600 may include one packet symbol 615 after the legacy preamble 610. Further, the wake-up packet 600 may include a payload 620.

The legacy preamble 610 may be provided for coexistence with a legacy STA. An L-SIG field for protecting a packet may be used in the legacy preamble 610 for the coexistence.

For example, an 802.11 STA may detect a start portion of a packet through the L-STF field in the legacy preamble 610. The STA may detect an end portion of the 802.11 packet through the L-SIG field in the legacy preamble 610.

In order to reduce false alarm of the 802.11n terminal, one modulated symbol 615 may be added after the L-SIG of FIG. 6. One symbol 615 may be modulated according to a BPSK (BiPhase Shift Keying) scheme. One symbol 615 may have a length of 4 us. One symbol 615 may have a 20 MHz bandwidth as a legacy part.

The legacy preamble 610 may be understood as a field for a third party legacy STA (STA not including LP-WUR). In other words, the legacy preamble 610 may not be decoded by the LP-WUR.

Figure 7:
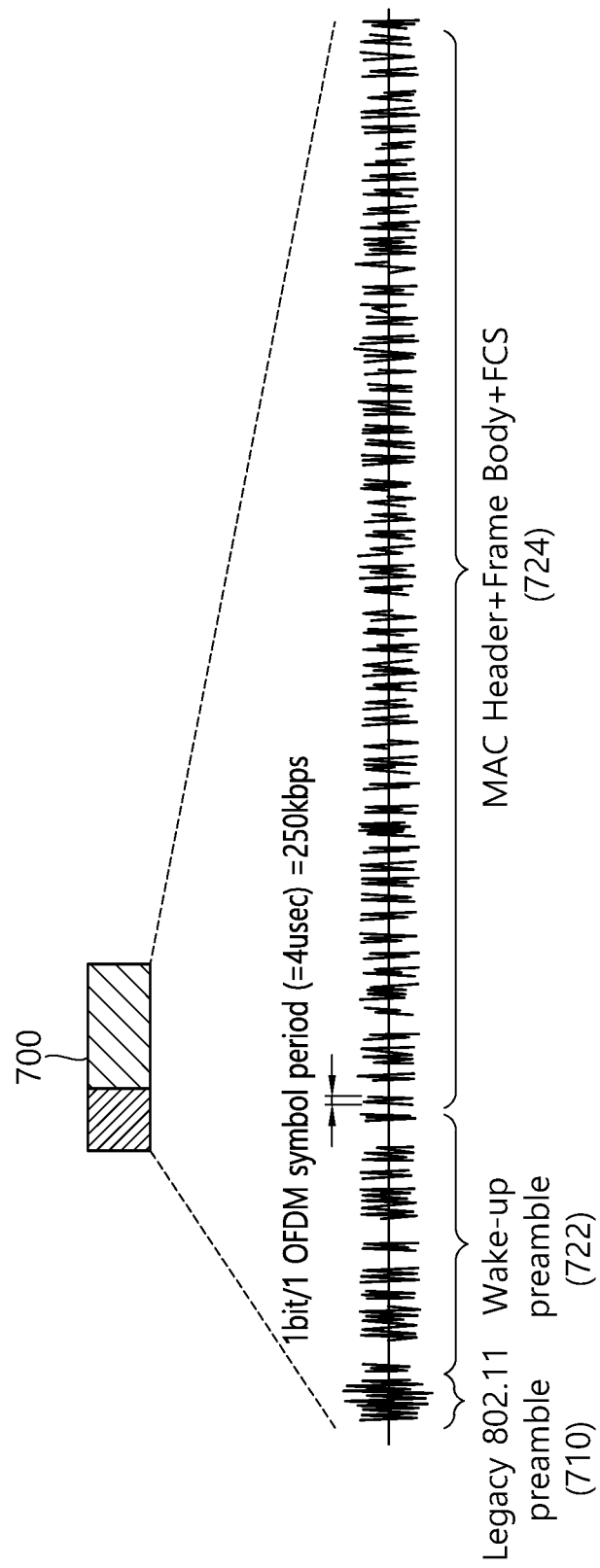
FIG. 7 shows a signal waveform of a wake-up packet.

FIG. 7 illustrates a signal waveform of a wake-up packet.

Referring to FIG. 7, a wake-up packet 700 may include a legacy preamble (802.11 preamble) 710 and payloads 722 and 724 modulated based on on-off keying (OOK). That is, the wake-up packet WUP according to the present embodiment may be understood in a form in which a legacy preamble and a new LP-WUR signal waveform coexist.

OOK may not be applied to the legacy preamble 710 of FIG. 7. As described above, the payloads 722 and 724 may be modulated according to the OOK. However, the wake-up preamble 722 included in the payloads 722 and 724 may be modulated according to another modulation scheme.

For example, it may be assumed that the legacy preamble 710 is transmitted based on a channel band of 20 MHz to which 64 FFTs are applied. In this case, the payloads 722 and 724 may be transmitted based on a channel band of about 4.06 MHz.

Figure 8:
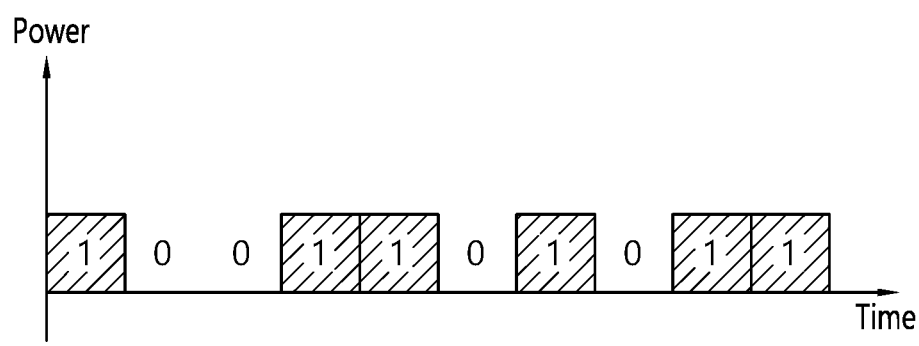
FIG. 8 is a diagram illustrating a procedure in which power consumption is determined according to a ratio of bit values constituting binary sequence information.

FIG. 8 is a diagram illustrating a procedure in which power consumption is determined according to a ratio of bit values constituting binary sequence information.

Referring to FIG. 8, binary sequence information having '1' or '0' as a bit value may be expressed. Communication according to the OOK modulation scheme may be performed based on a bit value of the binary sequence information.

For example, when a light emitting diode is used for visible light communication, if the bit value constituting binary sequence information is '1', the light emitting diode may be turned on, and if the bit value is '0', the light emitting diode may be turned off.

As the receiving device receives and restores data transmitted in the form of visible light according to flickering of the light emitting diode, communication using visible light is enabled. However, because the human eye cannot recognize flickering of the light emitting diode, the person feels that the lighting is continuously maintained.

For convenience of description, as shown in FIG. 8, binary sequence information having 10 bit values may be provided. For example, binary sequence information having a value of '1001101011' may be provided.

As described above, when the bit value is '1', the transmitting terminal is turned on, and when the bit value is '0', the transmitting terminal is turned off, and thus symbols corresponding to 6 bit values of the above 10 bit values are turned on.

Because the wake-up receiver WUR according to the present embodiment is included in the receiving terminal, transmission power of the transmitting terminal may not be largely considered. The reason why the OOK is used in this embodiment is that power consumed in a decoding process of the received signal is very small.

Until the decoding procedure is performed, there may be no significant difference between power consumed by the main radio and power consumed by the WUR. However, as a decoding procedure is performed by the receiving terminal, a large difference may occur between power consumed in the main radio module and power consumed in the WUR module. Below is approximate power consumption.

Existing Wi-Fi power consumption is about 100 mW. Specifically, power consumption of Resonator+Oscillator+PLL (1500 uW)→LPF (300 uW)→ADC (63 uW)→decoding processing (Orthogonal frequency-division multiplexing (OFDM) receiver) (100 mW) may occur.

However, WUR power consumption is about 1 mW. Specifically, power consumption of Resonator+Oscillator (600 uW)→LPF (300 uW)→ADC (20 uW)→decoding processing (Envelope detector) (1 uW) may occur.

Figure 9:
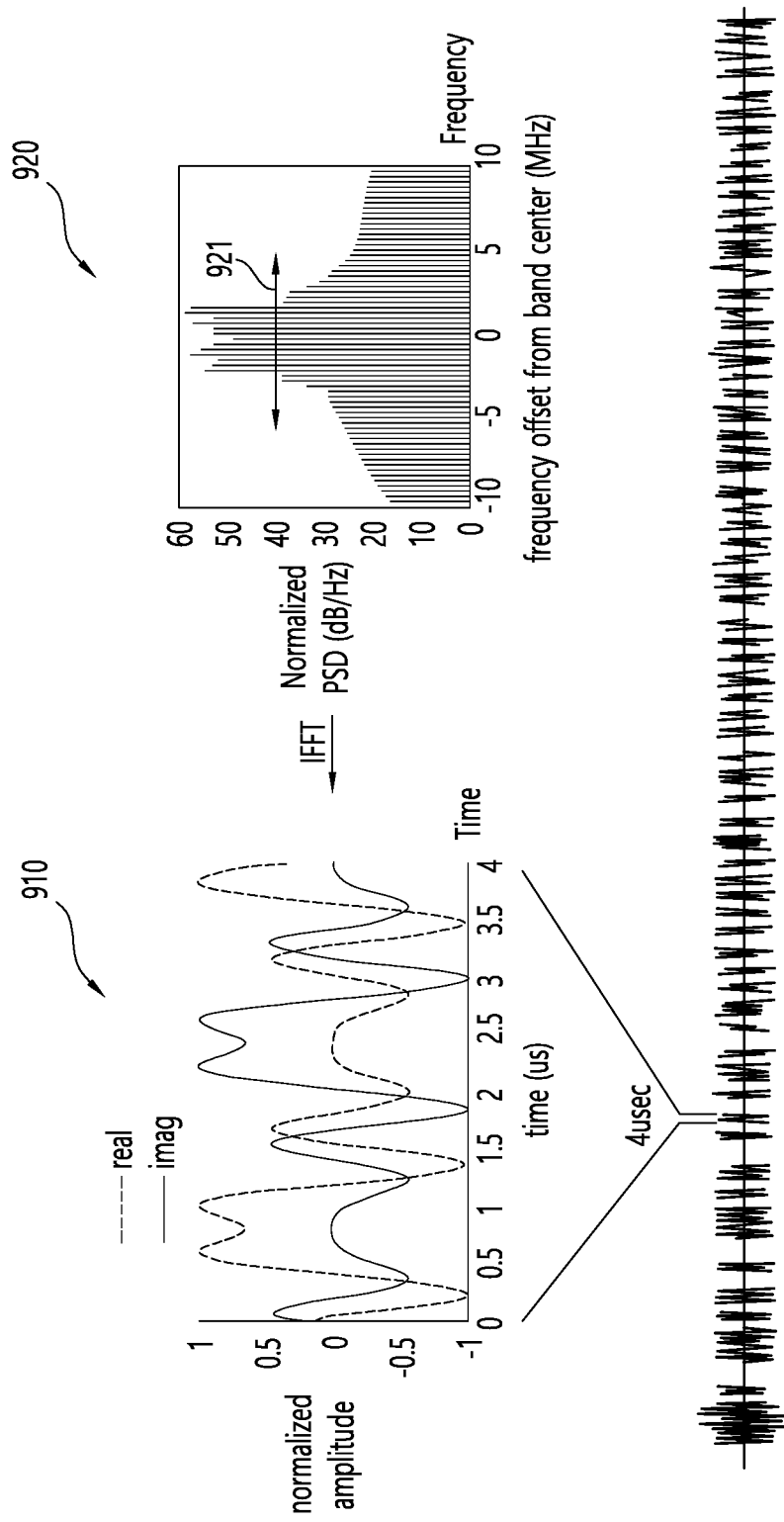
FIG. 9 is a diagram illustrating a design process of a pulse with OOK.

FIG. 9 is a diagram illustrating a design process of a pulse according to OOK.

A wireless terminal according to the present embodiment may use an existing orthogonal frequency-division multiplexing (OFDM) transmitter of 802.11 in order to generate pulses according to OOK. The existing 802.11 OFDM transmitter may generate a 64-bit sequence by applying 64-point IFFT.

Referring to FIG. 1 to FIG. 9, the wireless terminal according to the present embodiment may transmit a payload of a modulated wake-up packet (WUP) according to OOK. The payload (e.g., 620 of FIG. 6) according to the present embodiment may be implemented based on an ON-signal and an OFF-signal.

The OOK may be applied for the ON-signal included in the payload (e.g., 620 of FIG. 6) of the WUP. In this case, the ON-signal may be a signal having an actual power value.

With reference to a frequency domain graph 920, an ON-signal included in the payload (e.g., 620 of FIG. 6) may be obtained by performing IFFT for the N2 number of subcarriers (N2 is a natural number) among the N1 number of subcarriers (N1 is a natural number) corresponding to a channel band of the WUP. Further, a predetermined sequence may be applied to the N2 number of subcarriers.

For example, a channel band of the wakeup packet WUP may be 20 MHz. The N1 number of subcarriers may be 64 subcarriers, and the N2 number of subcarriers may be 13 consecutive subcarriers (921 in FIG. 9). A subcarrier interval applied to the wakeup packet WUP may be 312.5 kHz.

The OOK may be applied for an OFF-signal included in the payload (e.g., 620 of FIG. 6) of the WUP. The OFF-signal may be a signal that does not have an actual power value. That is, the OFF-signal may not be considered in a configuration of the WUP.

The ON-signal included in the payload (620 of FIG. 6) of the WUP may be determined (i.e., demodulated) to a 1-bit ON-signal (i.e., '1') by the WUR module (e.g., 512 of FIG. 5). Similarly, the OFF-signal included in the payload may be determined (i.e., demodulated) to a 1-bit OFF-signal (i.e., '0') by the WUR module (e.g., 512 of FIG. 5).

A specific sequence may be preset for a subcarrier set 921 of FIG. 9. In this case, the preset sequence may be a 13-bit sequence. For example, a coefficient corresponding to the DC subcarrier in the 13-bit sequence may be '0', and the remaining coefficients may be set to '1' or '−1'.

With reference to the frequency domain graph 920, the subcarrier set 921 may correspond to a subcarrier whose subcarrier indices are '−6' to '+6'.

For example, a coefficient corresponding to a subcarrier whose subcarrier indices are '−6' to '−1' in the 13-bit sequence may be set to '1' or '−1'. A coefficient corresponding to a subcarrier whose subcarrier indices are '1' to '6' in the 13-bit sequence may be set to '1' or '−1'.

For example, a subcarrier whose subcarrier index is '0' in the 13-bit sequence may be nulled. All coefficients of the remaining subcarriers (subcarrier indexes '−32' to '−7' and subcarrier indexes '+7' to '+31'), except for the subcarrier set 921 may be set to '0'.

The subcarrier set 921 corresponding to consecutive 13 subcarriers may be set to have a channel bandwidth of about 4.06 MHz. That is, power by signals may be concentrated at 4.06 MHz in the 20 MHz band for the wake-up packet (WUP).

According to the present embodiment, when a pulse according to the OOK is used, power is concentrated in a specific band and thus there is an advantage that a signal to noise ratio (SNR) may increase, and in an AC/DC converter of the receiver, there is an advantage that power consumption for conversion may be reduced. Because a sampling frequency band is reduced to 4.06 MHz, power consumption by the wireless terminal may be reduced.

An OFDM transmitter of 802.11 according to the present embodiment may have may perform IFFT (e.g., 64-point IFFT) for the N2 number (e.g., consecutive 13) of subcarriers of the N1 number (e.g., 64) of subcarriers corresponding to a channel band (e.g., 20 MHz band) of a wake-up packet.

In this case, a predetermined sequence may be applied to the N2 number of subcarriers. Accordingly, one ON-signal may be generated in a time domain. One bit information corresponding to one ON-signal may be transferred through one symbol.

For example, when a 64-point IFFT is performed, a symbol having a length of 3.2 us corresponding to a subcarrier set 921 may be generated. Further, when a cyclic prefix (CP, 0.8 us) is added to a symbol having a length of 3.2 us corresponding to the subcarrier set 921, one symbol having a total length of 4 us may be generated, as in the time domain graph 910 of FIG. 9.

Further, the OFDM transmitter of 802.11 may not transmit an OFF-signal.

According to the present embodiment, a first wireless terminal (e.g., 510 of FIG. 5) including a WUR module (e.g., 512 of FIG. 5) may demodulate a receiving packet based on an envelope detector that extracts an envelope of a received signal.

For example, the WUR module (e.g., 512 of FIG. 5) according to the present embodiment may compare a power level of a received signal obtained through an envelope of the received signal with a predetermined threshold level.

If a power level of the received signal is higher than a threshold level, the WUR module (e.g., 512 of FIG. 5) may determine the received signal to a 1-bit ON-signal (i.e., '1'). If a power level of the received signal is lower than a threshold level, the WUR module (e.g., 512 of FIG. 5) may determine the received signal to a 1-bit OFF-signal (i.e., '0').

Generalizing contents of FIG. 9, each signal having a length of K (e.g., K is a natural number) in the 20 MHz band may be transmitted based on consecutive K subcarriers of 64 subcarriers for the 20 MHz band. For example, K may correspond to the number of subcarriers used for transmitting a signal. Further, K may correspond to a bandwidth of a pulse according to the OOK.

All coefficients of the remaining subcarriers, except for K subcarriers among 64 subcarriers may be set to '0'.

Specifically, for a one bit OFF-signal corresponding to '0' (hereinafter, information 0) and a one bit ON-signal corresponding to '1' (hereinafter, information 1), the same K subcarriers may be used. For example, the used index for the K subcarriers may be expressed as 33-floor (K/2): 33+ceil (K/2)−1.

In this case, the information 1 and the information 0 may have the following values. Information 0=zeros (1, K)
Information 1=alpha*ones (1, K)

The alpha is a power normalization factor and may be, for example, 1/sqrt (K).

Figure 10:
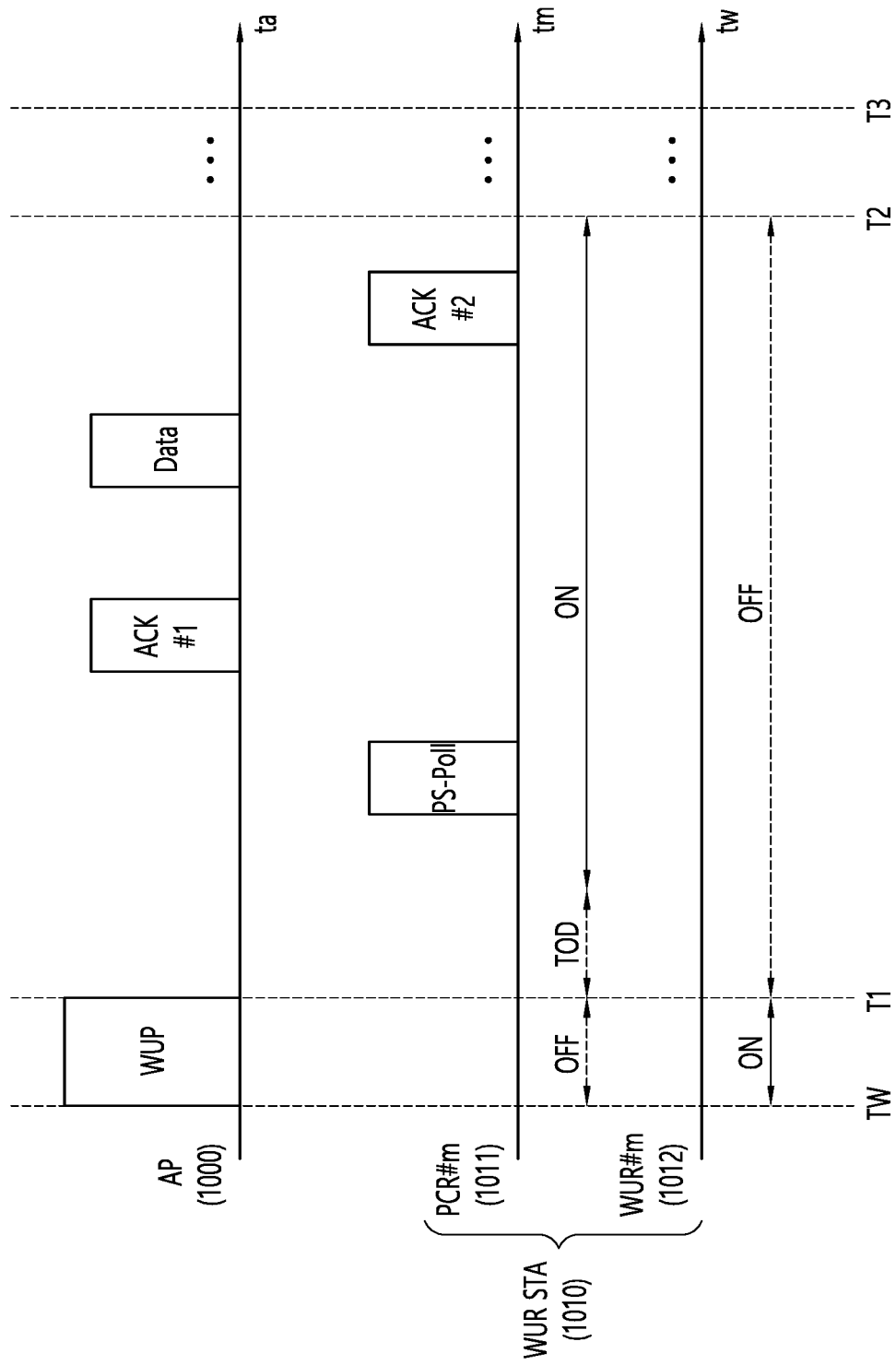
FIG. 10 is a diagram illustrating a basic operation for a WUR STA.

FIG. 10 illustrates a basic operation for a WUR STA.

Referring to FIG. 10, an AP 1000 may correspond to the second wireless terminal 520 of FIG. 5. A horizontal axis of the AP 1000 of FIG. 10 may indicate a time ta. A vertical axis of the AP 1000 of FIG. 10 may be related to presence of a packet (or frame) to be transmitted by the AP 1000.

A WUR STA 1010 may correspond to the first wireless terminal 510 of FIG. 5. The WUR STA 1010 may include a main radio module (or PCR #m) 1011 and a WUR module (or WUR #m) 1012. The main radio module 1011 of FIG. 10 may correspond to the main radio module 511 of FIG. 5.

Specifically, the main radio module 1011 may support both a reception operation for receiving an 802.11-based packet from the AP 1000 and a transmission operation for transmitting the 802.11-based packet to the AP 1000. For example, the 802.11-based packet may be a packet modulated according to an OFDM scheme.

A horizontal axis of the main radio module 1011 may indicate a time tm. An arrow displayed at the lower end of the horizontal axis of the main radio module 1011 may be related to a power state (e.g., ON state or OFF state) of the main radio module 1011.

The WUR module 1012 in FIG. 10 may correspond to the WUR module 512 in FIG. 5. Specifically, the WUR module 1012 can support only an operation of receiving packets modulated with on-off keying (OOK) from the AP 1000.

A horizontal axis of the WUR module 1012 may indicate a time tw. An arrow indicated at the lower end of the horizontal axis of the WUR module 1012 may be related to a power state (e.g., ON state or OFF state) of the WUR module 1012.

The WUR STA 1010 in FIG. 10 may be understood as a wireless terminal associated with the AP 1000 through an association procedure.

The WUR STA 1010 in FIG. 10 may be understood as a wireless terminal operating in the PS mode. Accordingly, the WUR STA 1010 can control the main radio module 1011 such that it is in a doze state or an awake state.

Further, the WUR STA 1010 may be understood as a wireless terminal operating in the WUR mode. Accordingly, the WUR STA 1010 can control the WUR module 1012 such that it is in a turn-off state or a turn-on state.

Referring to FIG. 5 and FIG. 10, the AP 1000 of FIG. 10 may correspond to the second wireless terminal 520 of FIG. 5. A horizontal axis of the AP 1000 of FIG. 10 may represent a time ta. A vertical axis of the AP 1000 of FIG. 10 may be related to presence of a packet (or frame) to be transmitted by the AP 1000.

The WUR STA 1010 may correspond to the first wireless terminal 510 of FIG. 5. The WUR STA 1010 may include a main radio module (or PCR #m) 1011 and a WUR module (or WUR #m) 1012. The main radio module 1011 of FIG. 10 may correspond to the main radio module 511 of FIG. 5.

Specifically, the main radio module 1011 may support both a reception operation for receiving an 802.11-based packet from the AP 1000 and a transmission operation for transmitting an 802.11-based packet to the AP 1000. For example, the 802.11-based packet may be a packet modulated according to the OFDM scheme.

A horizontal axis of the main radio module 1011 may represent a time tm. An arrow displayed at the lower end of the horizontal axis of the main radio module 1011 may be related to a power state (e.g., ON state or OFF state) of the main radio module 1011.

A vertical axis of the main radio module 1011 may be related to presence of a packet to be transmitted based on the main radio module 1011. A WUR module 1012 of FIG. 10 may correspond to the WUR module 512 of FIG. 5. Specifically, the WUR module 1012 may support only a reception operation for a packet modulated from the AP 1000 according to OOK.

A horizontal axis of the WUR module 1012 may represent a time tw. Further, an arrow displayed at the lower end of the horizontal axis of the WUR module 1012 may be related to a power state (e.g., ON state or OFF state) of the WUR module 1012.

In a wake-up period TW to T1 in FIG. 10, the WUR STA 1010 can control the main radio module 1011 such that it is in a doze state (i.e., OFF state). Further, the WUR STA 1010 can control the WUR module 1012 such that it is in a turn-on state (i.e., ON state).

When a data packet for the WUR STA 1010 exists in the AP 1000, the AP 1000 may transmit a wake-up packet (WUP) to the WUR STA 1010 in a contention-based manner.

In this case, the WUR STA 1010 may receive the WUP based on the WUR module 1012 in a turn-on state (i.e., ON state). Herein, the WUP may be understood based on the description mentioned above with reference to FIG. 5 to FIG. 7.

In a first duration T1 to T2 of FIG. 10, a wake-up signal (e.g., 523 of FIG. 5) for waking up the main radio module 511 according to the WUP received in the WUR module 1012 may be transferred to the main radio module 511.

In the present specification, a time required when the main radio module 511 transitions from a doze state to an awake state according to the wake-up signal (e.g., 523 of FIG. 5) may be referred to as a turn-on delay (hereinafter, TOD).

Referring to FIG. 10, the main radio module 511 may be in an awake state after a lapse of the turn-on delay (TOD).

For example, upon elapse of the TOD, the WUR STA 1010 may control the main radio module 1010 to be in the awake state (e.g., ON state). For example, upon elapse of a wake-up duration TW to T1, the WUR STA 1010 may control the WUR module 1012 to be in the turn-on state (i.e., OFF state).

Subsequently, the WUR STA 1010 may transmit a power save poll (hereinafter, PS-poll) to the AP 1000 based on the main radio module 1011 in the awake state (i.e., ON state).

Here, a PS-poll frame may be a frame for indicating that the WUR STA 1010 can receive a data packet for the WUR STA 1010 present within the AP 1000 based on the main radio module 1011. Further, the PS-poll frame may be a frame transmitted based on contention with another wireless terminal (not shown).

Subsequently, the AP 1000 may transmit a first ACK frame ACK #1 to the WUR STA 1010 in response to a PS-poll frame.

Subsequently, the AP 1000 may transmit a data packet for the WUR STA 1010 to the WUR STA 1010. In this case, the data packet for the WUR STA 1010 may be received based on the main radio module 1011 in an awake state (i.e., ON state).

Subsequently, the WUR STA 1010 may transmit a second ACK frame ACK #2 for notification of successful reception of the data packet for the WUR STA 1010 to the AP 1000.

Figure 11:
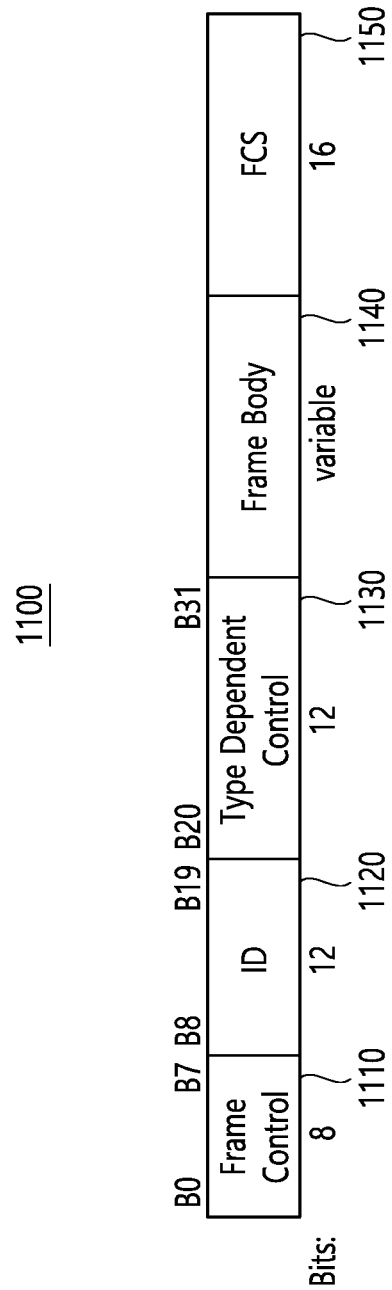
FIG. 11 is a diagram illustrating a structure of a wake-up packet according to an embodiment.

FIG. 11 is a diagram illustrating a structure of a wake-up packet according to an embodiment.

Referring to FIGS. 1 to 11, a payload field (e.g., 620 in FIG. 6) included in a wake-up packet according to an embodiment may conform to a MAC frame structure 1100 of FIG. 11.

The MAC frame structure 1100 of FIG. 11 may include a plurality of fields 1110 to 1150. A frame control field 1110 is represented by 8-bit information B0-B7 and will be described in more detail later with reference to FIG. 12.

An ID field 1120 may be represented by 12-bit information B8-B19. For example, when the wake-up packet is individually addressed, identification information (WUR identifier (WUR ID)) for a single wireless terminal that receives a wake-up packet to which unicast scheme is applied may be set to the ID field 1120.

Specifically, a WUR ID included in a wake-up packet to which the unicast scheme is applied may be used to identify a WUR STA intended to transmit an instantaneous response.

As another example, when the wake-up packet is group-addressed, a group ID (GID) for a plurality of wireless terminals that receives a wake-up packet to which a multicast scheme is applied may be set to the ID field 1120.

Further, when the wake-up packet is broadcast-addressed, identification information (transmitter ID (TXID)) of a wireless terminal that transmits a wake-up packet to which a broadcast scheme is applied may be set to the ID field 1120.

As another example, "0" may be set to the ID field 1120 in order to signal inclusion of a plurality of WUR IDs in a frame body (i.e., 1140 in FIG. 11) of the wake-up packet.

A type dependent control field 1130 may be represented by 12-bit information B20-B31. For example, the type dependent control field 1130 may include information related to BSS update.

A frame body field 1140 may have a variable length. The frame body field 1140 may include WUR IDs for a plurality of wireless terminals.

A frame check sequence (FCS) field 1150 may include 16-bit CRC information.

Figure 12:
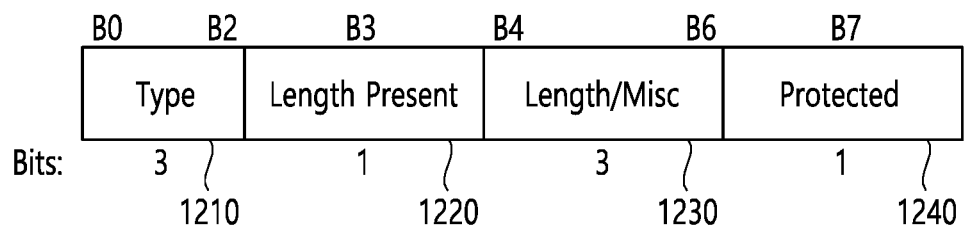
FIG. 12 is a diagram illustrating a structure of a frame control field of the wake-up packet according to an embodiment.

FIG. 12 is a diagram illustrating a structure of the frame control field of the wake-up packet according to the present embodiment.

Referring to FIG. 12, the frame control field 1200 (e.g., 1110 in FIG. 11) of the wake-up packet according to the present embodiment may include a plurality of fields 1210 to 1250.

For clear and brief understanding of the present specification, description will be given on the assumption that a type field 1210 includes information for indicating a wake-up packet. For example, the type field 1210 may be implemented such that it has a 3-bit length.

A length present field 1220 may include information for indicating whether the following field 1230 includes a length subfield. For example, the length present field 1220 may be implemented such that it has a 1-bit length.

A length/mist field 1230 may include the length subfield according to the information included in the length present field 1220. For example, when the length/mist field 1230 includes the length subfield, the length subfield can indicate the length of the frame body field (e.g., 1140 in FIG. 11).

A protected field 1240 may include information for indicating whether information transmitted through the wake-up packet is processed according to a message integrity check (MIC) algorithm.

Figure 13:
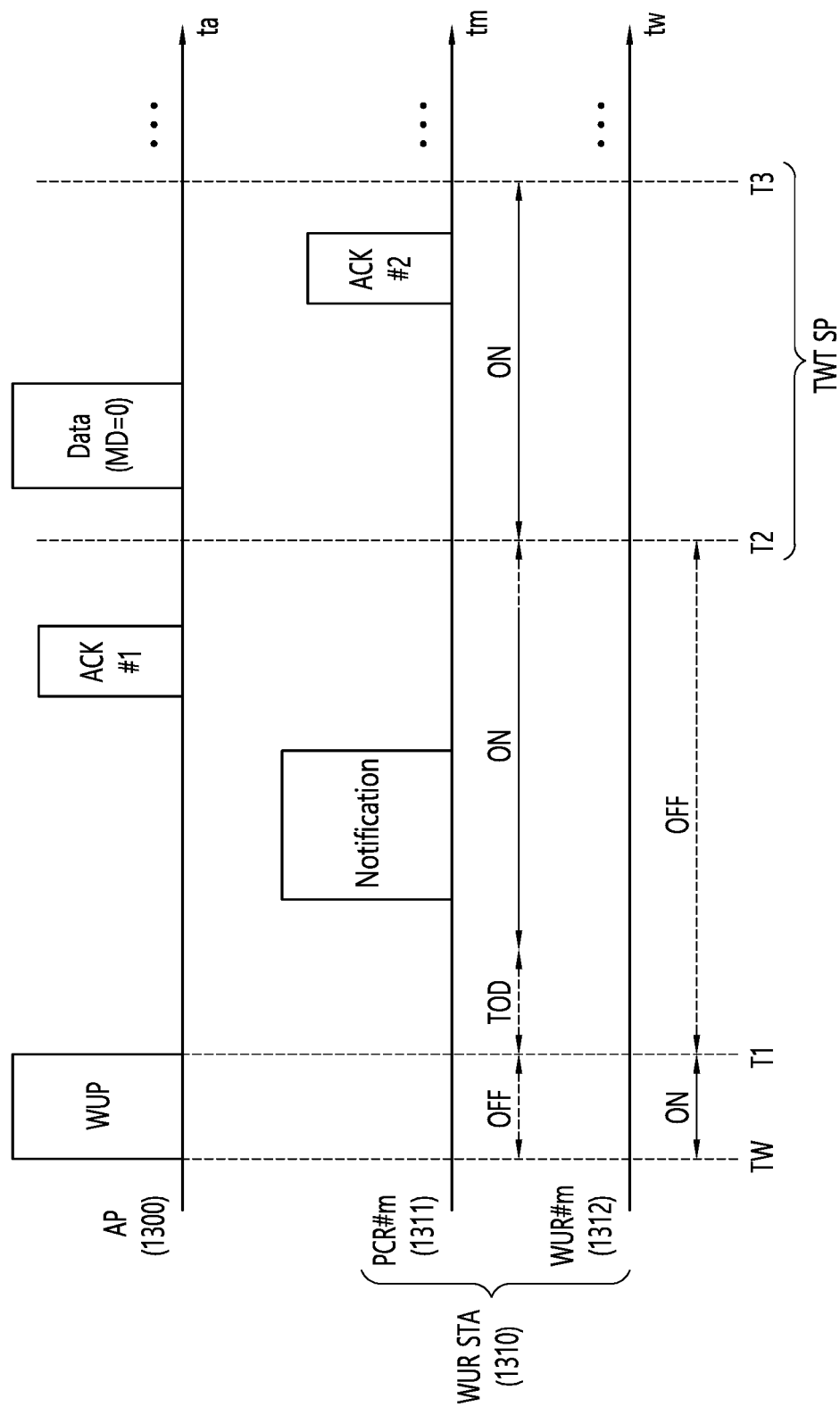
FIG. 13 illustrates a method for performing communication based on a power saving operation according to an embodiment.

FIG. 13 illustrates a method for performing communication based on a power saving operation according to an embodiment.

Referring to FIGS. 1 to 13, description of an AP 1300 and a WUR STA 1310 may be understood with reference to FIG. 10. Additionally, a PS operation agreed advance between the AP 1300 and the WUR STA 1310 of FIG. 13 may be assumed to be an individual target wake time (TWT) operation.

Accordingly, an individual TWT service period (hereinafter, TWT SP) may be set for PCR module based communication between the AP 1300 and the WUR STA 1310.

For clear and brief understanding of FIG. 13, it may be assumed that a PS operation agreed in advance between the AP 1300 and the WUR STA 1310 is suspended when the WUR STA 1310 operates in the WUR mode.

In a wake-up period TW to T1 of FIG. 13, the WUR STA 1310 can receive a wake-up packet WUP from the AP 1300.

In this case, the wake-up packet can be used to indicate that a frame buffered by the AP 1300 is available for the WUR STA 1310. Here, the wake-up packet WUP may be received based on the WUR module 1312 in a turn-on state.

In a first period T1 to T2 of FIG. 13, a turn-on delay TOD may elapse in order to cause the main radio module 1311 to switch from a doze state (i.e., OFF state) to an awake state (i.e., ON state) according to the wake-up packet.

Subsequently, the WUR STA 1310 can transmit a notification packet to the AP 1300 based on the main radio module 1311 in the awake state (i.e., ON state).

Subsequently, the WUR STA 1310 can receive a first ACK frame ACK #1 for notification of successful reception of the notification packet from the AP 1300.

For reference, the WUR STA 1310 can control the WUR module 1312 such that it is in a turn-off state (i.e., OFF state) in the first period T1 to T2.

Additionally, a notification frame of FIG. 13 may be used to notify that the main radio module 1311 is in an awake state. For example, the notification frame may be implemented as a PS-poll frame as shown in FIG. 10 or implemented as a QoS null frame including no payload.

According to the present embodiment, when the turn-on delay TOD has elapsed after reception of the wake-up packet WUP, the agreed PS operation suspended for the WUR STA 1310 in the WUR mode can be resumed.

Accordingly, the WUR STA 1310 can control the main radio module 1311 such that it is in an awake state (i.e., ON state) in a second period T2 to T3 (TWT SP) of FIG. 13 for the agreed PS operation.

The WUR STA 1310 can receive a data frame from the AP 1300 in the second period T2 to T3 of FIG. 13. For example, a more data (MD) field of the data frame may be set to "0" that is a value for notifying the absence of a following data frame.

Subsequently, the WUR STA 1310 can transmit a second ACK frame ACK #2 for notifying successful reception of the data frame to the AP 1300.

For reference, since it is not desirable that a retransmission standby time for the wake-up packet increase, the notification packet can be transmitted when the PCR module has switched to an ON state even outside the TWT SP, as shown in FIG. 13.

Although the second period T2 to T3 follows the first period T1 to T2 in FIG. 13, the present specification is not limited. That is, the WUR STA 1310 may control the main radio module 1311 such that it is in a doze state (i.e., OFF state) until the beginning of the TWT SP after a lapse of the first period T1 to T2.

Figure 14:
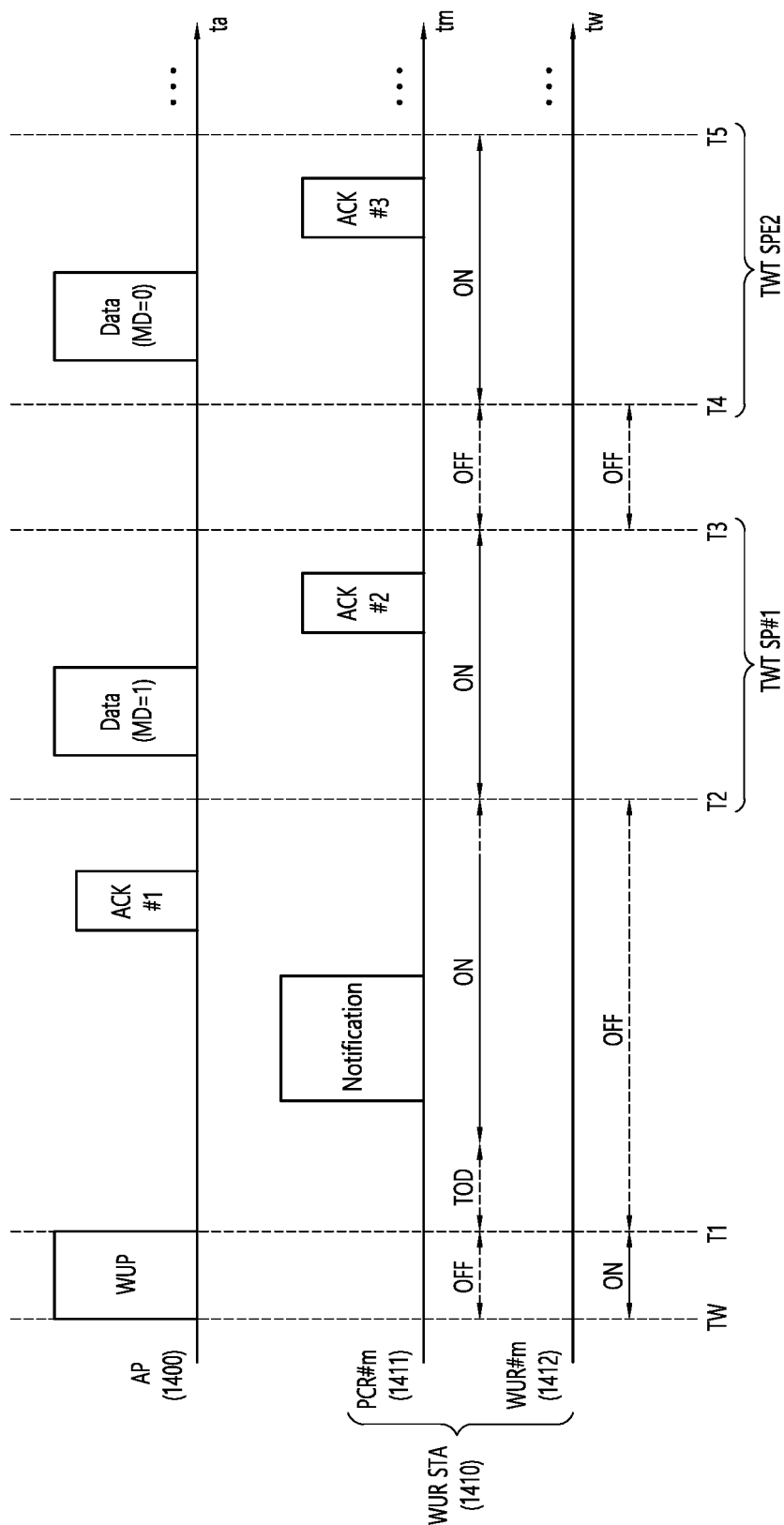
FIG. 14 illustrates a method for performing communication based on a power saving operation according to another embodiment.

FIG. 14 illustrates a method for performing communication based on a power save operation according to another embodiment.

A PS operation agreed in advance between an AP 1400 and a WUR STA 1410 may be assumed to be an individual target wake time (TWT) operation.

Accordingly, a plurality of individual TWT service periods TWT SP #1 and TWT SP #2 may be set for PCR module based communication between the AP 1400 and the WUR STA 1410.

Referring to FIGS. 13 and 14, a wake-up period TW to T1 and a first period T1 to T2 in FIG. 14 can be understood based on description of FIG. 13.

In a second period T2 to T3 (TWT SP #1) for the agreed PS operation, the WUR STA 1410 can receive a data frame from the AP 1400. For example, a more data (MD) field of the data frame may be set to "1" that a value for notifying the presence of a following data frame.

Subsequently, the WUR STA 1410 can transmit a second ACK frame ACK #2 for notifying successful reception of the data frame to the AP 1400.

The WUR STA 1410 that has received the data frame having the MD field set to "1" can determine whether the following data frame can be received from the AP 1400 within the first TWT SP (i.e., TWT SP #1).

FIG. 14 is illustrated on the assumption that it is determined that the following data frame cannot be received within the first TWT SP (i.e., TWT SP #1).

Accordingly, in a third period T3 to T4 in FIG. 14, the WUR STA 1410 can control the main radio module 1411 such that it is in a doze state until the next TWT SP (i.e., TWT SP #2) for the agreed PS operation.

For example, the WUR STA 1310 can control the WUR module 1412 such that it is in a turn-off state (i.e., OFF state) in the third period T3 to T4 in FIG. 14.

In a fourth period T4 to T5 (TWT ST #2) in FIG. 14 for the agreed PS operation, the WUR STA 1410 can receive the following data frame from the AP 1400. For example, the MD field of the following data frame can be set to "0" that is a value for notifying the absence of a following data frame.

Subsequently, the WUR STA 1410 can transmit a third ACK frame ACK #3 for notifying successful reception of the following data frame to the AP 1400.

Although FIGS. 13 and 14 are illustrated on the assumption that the wake-up packet WUP is received outside a TWT SP, the wake-up packet WUP may be received within a TWT SP.

Figure 15:
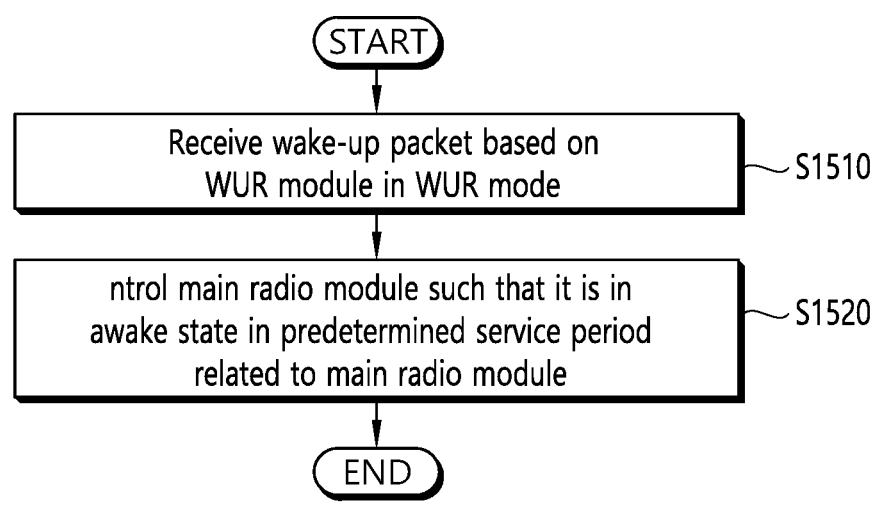
FIG. 15 is a flowchart illustrating a method for performing communication based on a power saving operation according to an embodiment.

FIG. 15 is a flowchart illustrating a method for performing communication based on a power saving operation according to an embodiment.

Referring to FIGS. 1 to 15, a first wireless terminal of FIG. 15 may be understood as a WUR STA including a main radio module and a WUR module for receiving a wake-up packet WUP modulated with OOK. A second wireless terminal of FIG. 15 may be understood as an AP.

In step S1510, the first wireless terminal can receive a wake-up packet from the second wireless terminal based on the WUR module in a WUR mode. Here, the WUR mode may be a state in which the WUR module alternates between a turn-on state and a turn-off state based on a power state of the main radio module.

For example, when the first wireless terminal is in the WUR mode, the first wireless terminal can control the WUR module such that it alternates between the turn-on state and the turn-off state based on the power state of the main radio module.

More specifically, when the power state of the main radio module is a doze state, the main radio module can be controlled by the first wireless terminal such that it is in a turn-on state for a duty cycle agreed between the first wireless terminal and the second wireless terminal for the WUR module.

For example, the wake-up packet may include information (e.g., a WUR ID of the WUR STA) related to an individually addressed frame for the first wireless terminal.

In step S1520, after a lapse of a predetermined time from reception of the wake-up packet, the first wireless terminal can control the main radio module such that it is in an awake state in a predetermined service period related to the main radio module.

For example, the predetermined service period may be an individual target wake time (TWT) period agreed in advance between the first wireless terminal and the second wireless terminal.

Although not illustrated in FIG. 15, the first wireless terminal may transmit a notification frame for notifying that the main radio module is in the awake state to the second wireless terminal after step S1520.

For example, the notification frame may be transmitted based on the main radio module in the awake state. Here, the notification frame may be a quality of service (QoS) null frame or a PS-poll frame.

Further, the notification frame may be immediately transmitted after the main radio module enters the awake state irrespective of whether the main radio module enters an agreed service period.

Although not illustrated in FIG. 15, the first wireless terminal may receive a data frame from the second wireless terminal after transmission of the notification frame. In this case, the data frame may include a more data (MD) field for indicating the presence of a following data frame.

Although not illustrated in FIG. 15, when the MD field is "1", the first wireless terminal may determine whether a following data frame can be received within a service period.

If it is determined that the following data frame cannot be received within the service period, the first wireless terminal may control the main radio module such that it is in a doze state until the following service period after a lapse of the service period.

Figure 16:
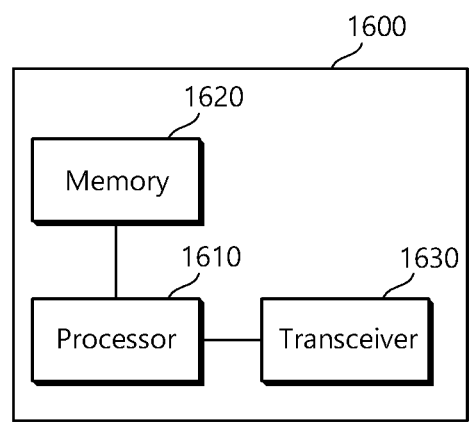
FIG. 16 is a block diagram illustrating a wireless device to which the present embodiment is applicable.

FIG. 16 is a block diagram showing a wireless device to which the present embodiment is applicable.

Referring to FIG. 16, the wireless device is an STA capable of implementing the above-described embodiment and may operate as an AP or a non-AP STA. Further, the wireless device may correspond to the aforementioned user or a transmission device that transmits signals to the user.

As illustrated, the wireless device of FIG. 16 includes a processor 1610, a memory 1620 and a transceiver 1630. The processor 1610, the memory 1620 and the transceiver 1630 may be implemented as separate chips or at least two blocks/functions thereof may be implemented through a single chip.

The transceiver 1630 includes a transmitter and a receiver, and only the operation of any one of the transmitter and the receiver may be performed or both the operations of the transmitter and the receiver may be performed when a specific operation is performed. The transceiver 1630 may include one or more antennas for transmitting and/or receiving RF signals. The transceiver 1630 may include an amplifier for amplifying received signals and/or transmitted signals and a band pass field for transmission over a specific frequency band.

The processor 1610 can implement functions, processes and/or methods proposed in the present specification. For example, the processor 1610 may perform the operations according to the above-described embodiment. That is, the processor 1610 can perform the operations described in the embodiments illustrated in FIGS. 1 to 15.

The processor 1610 may include an application-specific integrated circuit (ASIC), other chipsets, a logic circuit, a data processing device and/or a converter for converting a base band signal and an RF signal to each other. The memory 1620 may include a read-only memory (ROM), a random access memory (RAM), a flash memory, a memory card, a storage medium and/or other storage devices.

Although specific embodiments of the present specification have been described above, various modifications are possible without departing from the scope of the present specification. Accordingly, the scope of the present specification is not to be limited by the above-described embodiments but by the claims and the equivalents thereof.

The invention claimed is:

1. A method for performing communication based on a power saving operation in a wireless LAN system, the method comprising:

receiving, by a first wireless terminal including a main radio module and a wake-up radio (WUR) module for receiving a wake-up packet modulated with on-off keying (OOK), the wake-up packet from a second wireless terminal based on the WUR module in a WUR mode in which the WUR module is controlled to alternate between a turn-on state and a turn-off state based on a power state of the main radio module, the wake-up packet including information related to an individually addressed frame for the first wireless terminal; and controlling, by the first wireless terminal, the main radio module such that the main radio module is in an awake state in a predetermined service period related to the main radio module when a predetermined time has elapsed after reception of the wake-up packet;

transmitting, by the first wireless terminal, a notification frame for notifying that the main radio module is in the awake state to the second wireless terminal based on the main radio module in the awake state;

wherein the notification frame is transmitted irrespective of entry into the service period, and wherein the notification frame is a quality of service (QoS) null frame or a PS-poll frame, receiving, by the first wireless terminal, a data frame from the second wireless terminal after transmission of the notification frame;

wherein the data frame includes a more data (MD) field for indicating the presence of a following data frame, determining, by the first wireless terminal, whether a following data frame can be received within the service period when the MD field is "1"; and controlling, by the first wireless terminal, the main radio module such that the main radio module is in a doze state until a next service period after a lapse of the service period when it is determined that the following data frame cannot be received within the service period.

2. The method of claim 1, wherein the predetermined service period is an individual target wake time (TWT) period.

3. The method of claim 1, wherein, when the power state of the main radio module is the doze state, the main radio module is controlled by the first wireless terminal such that the main radio module is in a turn-on state for a duty cycle agreed between the first wireless terminal and the second wireless terminal for the WUR module.

4. A first wireless device performing a method for performing communication based on a power saving operation in a wireless LAN system, the first wireless device comprising:
   a transceiver for transmitting/receiving radio frequency (RF) signals; and
   a processor connected to the transceiver,
   wherein the transceiver includes a main radio module and a wake-up radio (WUR) module for receiving a wake-up packet modulated with on-off keying (OOK), and
   wherein the processor is configured to:
   receive the wake-up packet from a second wireless terminal based on the WUR module in a WUR mode in which the WUR module is controlled to alternate between a turn-on state and a turn-off state based on a power state of the main radio module,
   wherein the wake-up packet includes information related to an individually addressed frame for the first wireless terminal, and
   wherein the main radio module is controlled to be in an awake state in a predetermined service period related to the main radio module when a predetermined time has elapsed after reception of the wake-up packet,
   transmit a notification frame for notifying that the main radio module is in the awake state to the second wireless terminal based on the main radio module in the awake state;
   wherein the notification frame is transmitted irrespective of entry into the service period, and
   wherein the notification frame is a quality of service (QoS) null frame or a PS-poll frame,
   receive a data frame from the second wireless terminal after transmission of the notification frame;
   wherein the data frame includes a more data (MD) field for indicating the presence of a following data frame,
   determine whether a following data frame can be received within the service period when the MD field is "1"; and
   control the main radio module such that the main radio module is in a doze state until a next service period after a lapse of the service period when it is determined that the following data frame cannot be received within the service period.

5. The wireless terminal of claim 4, wherein the predetermined service period is an individual target wake time (TWT) period.

6. The wireless terminal of claim 4, wherein, when the power state of the main radio module is the doze state, the main radio module is controlled by the first wireless terminal such that the main radio module is in a turn-on state for a duty cycle agreed between the first wireless terminal and the second wireless terminal for the WUR module.

* * * * *